United States Patent [19]

Rozman et al.

[11] Patent Number: 5,055,765

[45] Date of Patent: Oct. 8, 1991

[54] VOLTAGE REGULATOR FOR DIRECT CURRENT AIRCRAFT POWER BUS

[75] Inventors: Gregory I. Rozman, Rockford, Ill.; William R. Owens, Waukesha, Wis.

[73] Assignee: Sundstrand Corporation, Rockford, Ill.

[21] Appl. No.: 577,307

[22] Filed: Sep. 4, 1990

[51] Int. Cl.⁵ .......................... H02H 7/06; H02P 9/02
[52] U.S. Cl. .................................. 322/22; 322/23; 322/25; 322/28
[58] Field of Search ................. 322/22, 23, 24, 25, 322/26, 28

[56] References Cited

U.S. PATENT DOCUMENTS

| | | |
|---|---|---|
| 3,652,920 | 3/1972 | South et al. ........................ 322/19 |
| 3,754,183 | 8/1973 | Ibamoto et al. .................... 323/22 |
| 4,634,954 | 1/1987 | Kato et al. ......................... 322/28 |

Primary Examiner—Steven L. Stephan
Assistant Examiner—Ben Davidson
Attorney, Agent, or Firm—Whitham & Marhoefer

[57] ABSTRACT

A voltage regulator for an aircraft d.c. power supply in which the gain of the voltage regulator varies as a function of d.c. load current and a.c. generator speed. In addition, in a preferred embodiment of the invention, low noise lead compensation is provided by a network which models the system response to changing load currents. It predicts the change in d.c. voltage which would occur in response to load current changes and provides regulator lead compensation.

20 Claims, 4 Drawing Sheets

VOLTAGE REGULATOR FOR DIRECT CURRENT AIRCRAFT POWER BUS

BACKGROUND OF THE INVENTION

1. Field of the Invention

The present invention generally relates to aircraft power systems, and more particularly to an improved system for regulating the voltage on a direct current (d.c.) aircraft power bus.

2. Description of the Prior Art

Direct current electrical power supply systems proposed for use in aircraft comprise an alternating current (a.c.) generator, a full-wave rectifier, and a filter capacitor. A bus connects the d.c. voltage across the filter capacitor to the load which varies over a wide range. In such prior art systems, the d.c. voltage across the capacitor is sensed. A voltage regulator compares the sensed voltage with a reference and controls a d.c. exciter drive to maintain a constant d.c. output voltage.

As mentioned above, the resistive load in an aircraft varies over a wide range. In addition, as will be appreciated by those skilled in the art, the frequency of the a.c. generator also varies owing to the fact it is driven by the aircraft propulsion unit. The response of the overall system to the signal fed back depends on magnitude of the load owing to the resistive-capacitive network formed by the load and the filter capacitor. For large loads (low resistance—high current) the overall system response is relatively fast. In this high current situation the gain of the voltage regulator can be high. However, when the resistance is high and the current is low, system response is relatively slow, and if the regulator gain is high the system may be unstable. In addition, the system gain is also a function the rotational speed of the a.c. generator; as its speed increases the system gain increases. The voltage regulator gain should change as the rotational speed of the a.c. generator changes in order to maintain the overall open loop system gain constant.

U.S. Pat. No. 4,807,106 is an example of a d.c. aircraft power supply. That invention provides a method for regulating a d.c. electrical power source having a generator, with an exciter field coil, that produces an a.c. output voltage which is rectified to produce a d.c. output voltage. The method includes the steps of: producing a first signal proportional to the a.c. output voltage of the generator; sensing the current in the exciter field winding of the generator; producing a second signal proportional to the exciter field current; and combining the first and second signals to produce a third signal. A fourth signal proportional to the d.c. output voltage of the power source is compared to a d.c. reference signal to produce a trim error signal. The trim error signal is combined with an a.c. reference signal to produce a fifth signal. The third and fifth signals are compared to produce a sixth signal and the current in the exciter field winding is controlled in response to this sixth signal.

SUMMARY OF THE INVENTION

An object of this invention is the provision of a d.c. power system for aircraft in which the voltage is closely regulated despite wide changes in load and in a.c. generator supply frequency.

Briefly, this invention contemplates the provision of a voltage regulator for an aircraft d.c. power supply in which the gain of the voltage regulator varies as a function of d.c. load current and a.c. generator speed. In addition, in a preferred embodiment of the invention, low noise lead compensation is provided by a network which models the system response to changing load currents. It predicts the change in d.c. voltage which would occur in response to load current changes and provides regulator lead compensation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
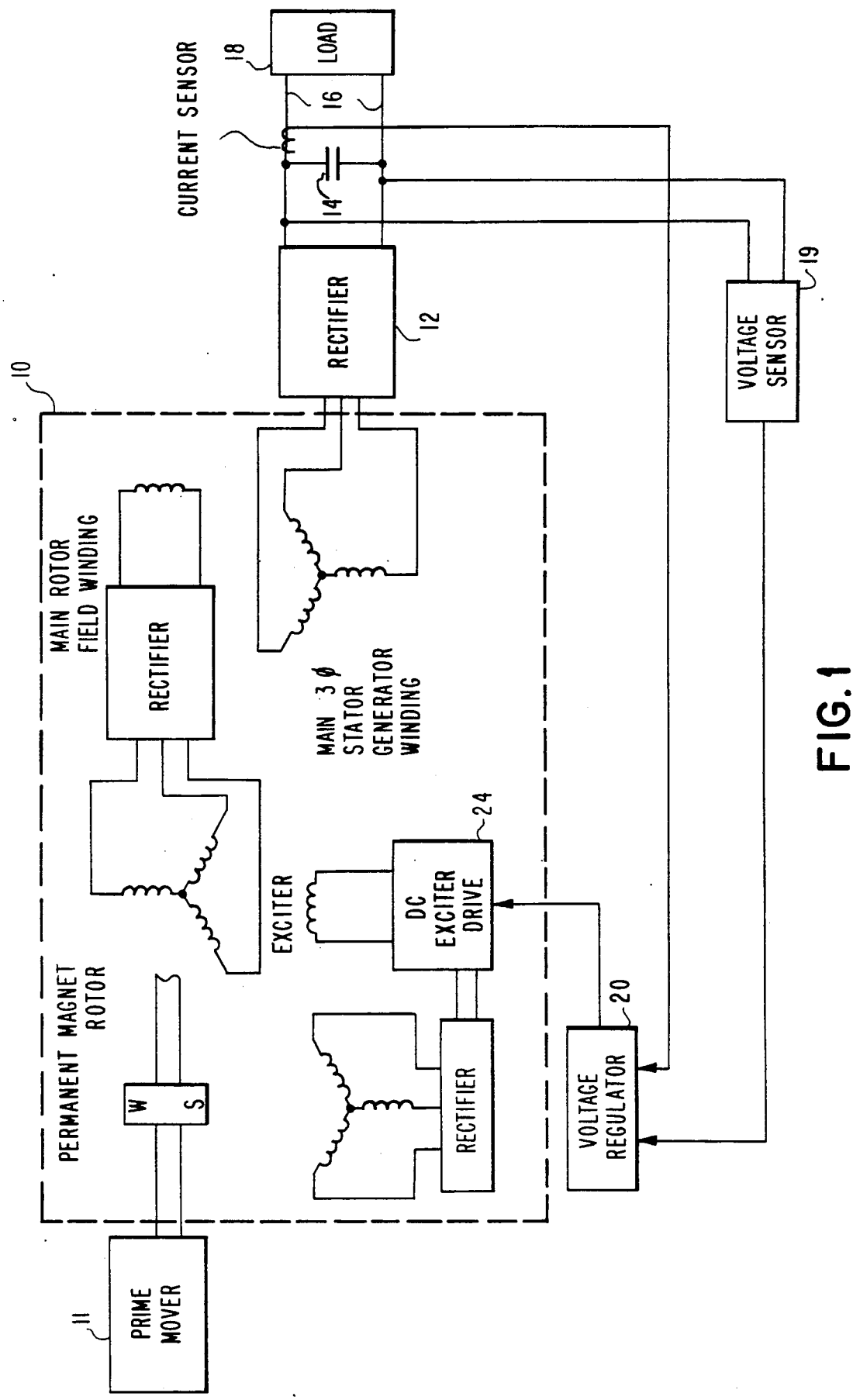
FIG. 1 is a block diagram of an aircraft d.c. power system of the type contemplated by this invention.

Referring now to FIG. 1, this drawing shows a typical d.c. aircraft power supply system of the type to which the invention is applicable. At the level of detail in FIG. 1 the system is well known and well understood by those skilled in the art and shown and explained briefly here by way of background. An a.c. generator 10 driven by a prime mover 11, such as an aircraft turbine generates an a.c. voltage whose frequency varies over a wide range as the turbine speed varies. A full-wave rectifier 12 converts the a.c. voltage to a pulsating d.c. voltage which is smoothed by a capacitor 14. A d.c. bus 16 connects a load 18 across the terminals of the capacitor 14. It will be appreciated by those skilled in the art that the load 18 can vary over a wide range of values. In order to maintain the d.c. bus voltage constant (e.g., a constant 270 volts d.c.) a sensor 19 senses the d.c. bus voltage and voltage regulator 20 compares the bus voltage with a d.c. voltage and a reference. The regulator output controls the excitation current of an exciter drive 24. The magnitude of the exciter current controls the magnitude of the main 3 phase stator output voltage coupled to rectifier 12.

Figure 2:
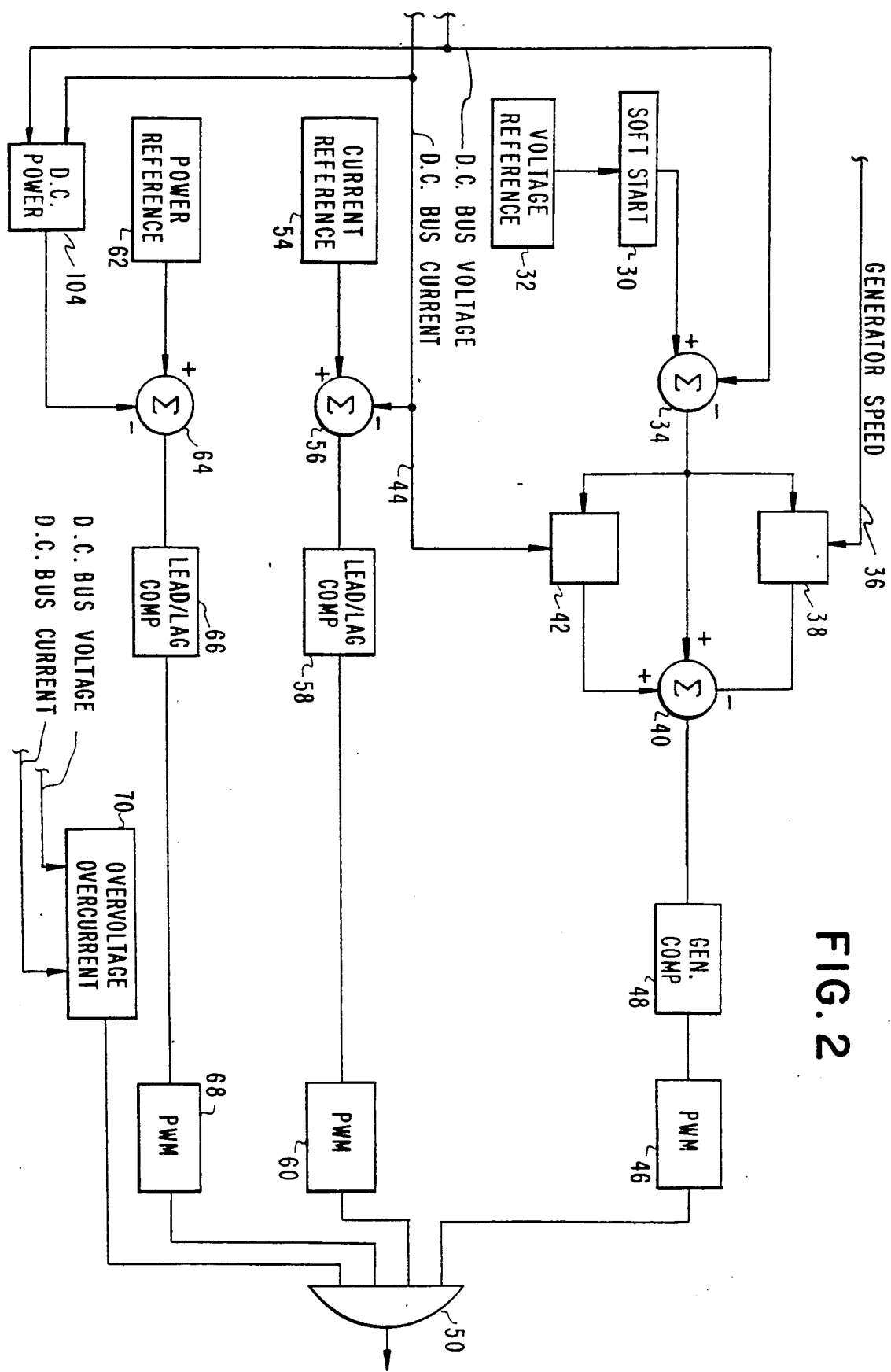
FIG. 2 is another block diagram of an aircraft d.c. power system similar to FIG. 1 but adding in block form details of one embodiment of a voltage regulator system in accordance with the teachings of this invention.

Referring now to FIG. 2, during initial power up of the d.c. bus, a suitable circuit 30, such as a programmed variable resistance gradually increases the magnitude of the voltage coupled from a reference 32 to the input of a summer 34. This produces an initial gradual increase in d.c. bus voltage during starting and prevents stress of the capacitor 14. The other input to the summer 34 is the d.c. bus voltage signal and the summer 34 output is an error signal which maintains the bus voltage at the value prescribed by the reference 32. As will be appreciated by those skilled in the art, the magnitude of the error signal is a function of the magnitude of difference between the reference and the d.c. and the signal gain of the summer 34. In subsequent stages the overall gain of the voltage regulator is increased or decreased as described herein in order to compensate for changes in a.c. generator speed and changes in system load.

In order to compensate a.c. generator speed, a suitable function generator 38, such as a multiplier with a limit function for example, combines a signal proportional to generator speed on line 36 and the error output signal from summer 34. The output of function generator 38 is a signal whose magnitude is proportional to the voltage error signal and the speed of the a.c. generator 10. For an instantaneous error signal, as the a.c. generator speed increases, magnitude of the output of multiplier increases and this signal is subtracted from the error signal output of summer 34 at a summer 40. Thus, as the a.c. generator speed increases the overall voltage regulator gain decreases. This allows relatively high regulator gain at low a.c. generator speeds without instability at high generator speeds.

A regulator gain satisfactory for operation at low-load resistance (high load current) is unsatisfactory at low load currents as it would result in an unstable or underdamped condition. The regulator gain is, in accordance with the teachings of this invention, varied as a function of load current, increasing the regulator gain as the current increases and decreasing it as the load current decreases. To this end, a suitable function generator 42, combines a current signal proportional to d.c. bus current on line 44 with the d.c. error voltage from summer 34. The output of 42 is a signal which is a function of d.c. bus error voltage and the d.c. bus current. This output coupled summing junction 40 is added to the error signal. As the d.c. bus current increases the gain of the regulator increases; as the load current decreases the gain decreases.

The magnitude output of the summer junction 40 is a function of the d.c. bus error voltage, the generator speed and the d.c. load current. The error signal output of summer 40 is coupled to the input of a pulse-width-modulator 46 via a circuit 48 which provides proportional plus integral plus lead/lag compensation. An AND gate 50 couples the output of the modulator 46 to the d.c. exciter drive 24 to control the amplitude of the generator output and hence the magnitude of the voltage on the d.c. bus. The pulse-width-modulator 46 modulates the output of d.c. exciter drive 24 in an on-off modulating pattern.

The voltage regulator of this invention provides current and power limiting so that the d.c. bus voltage is automatically decreased if the d.c. current or d.c. power exceeds a multiple of rated current or rated power. The current limiter includes a current reference 54 whose output is coupled to a summer 56, the other input to which is a d.c. bus current signal. A lead/lag compensation network 58 couples the error signal output of summer 56 to the input of a pulse-width-modulator 60 whose output is coupled to another input of AND gate 50. In operation, when the d.c. current exceeds the reference (for example when the current exceeds twice the rated current) the duty cycle of the modulator is reduced in proportion to the magnitude of the error signal. Gate 50 is thus disabled for a portion of each PWM cycle which reduces the excitation of the a.c. generator and reduces the generator output voltage irrespective of the output of PWM 46 in response to its input error signal.

The regulator also provides power limiting so that the d.c. bus voltage is automatically decreased if the d.c. power exceeds rated power. The power limiter includes a power reference 62 whose output is coupled to a summer 64, the other input to which is from d.c. current and voltage multiplier 104 whose output is d.c. bus power. A lead/lag compensation network 66 couples the error signal output of summer 64 to the input of a pulse-width-modulator 68 whose output is coupled to another input of AND gate 50. When the d.c. power exceeds the reference the duty cycle of the modulator is reduced in proportion to the magnitude of the error signal. Gate 50 is thus disabled for a portion of each PWM cycle which reduces the excitation of the a.c. generator and reduces the generator output voltage irrespective of the output of PWM 46 in response to its input error signal.

An over voltage and over current protection circuit 70 provides an output which disables AND gate 50 in the event of an over voltage or over current condition, which removes the excitation from the a.c. generator.

Figure 3:
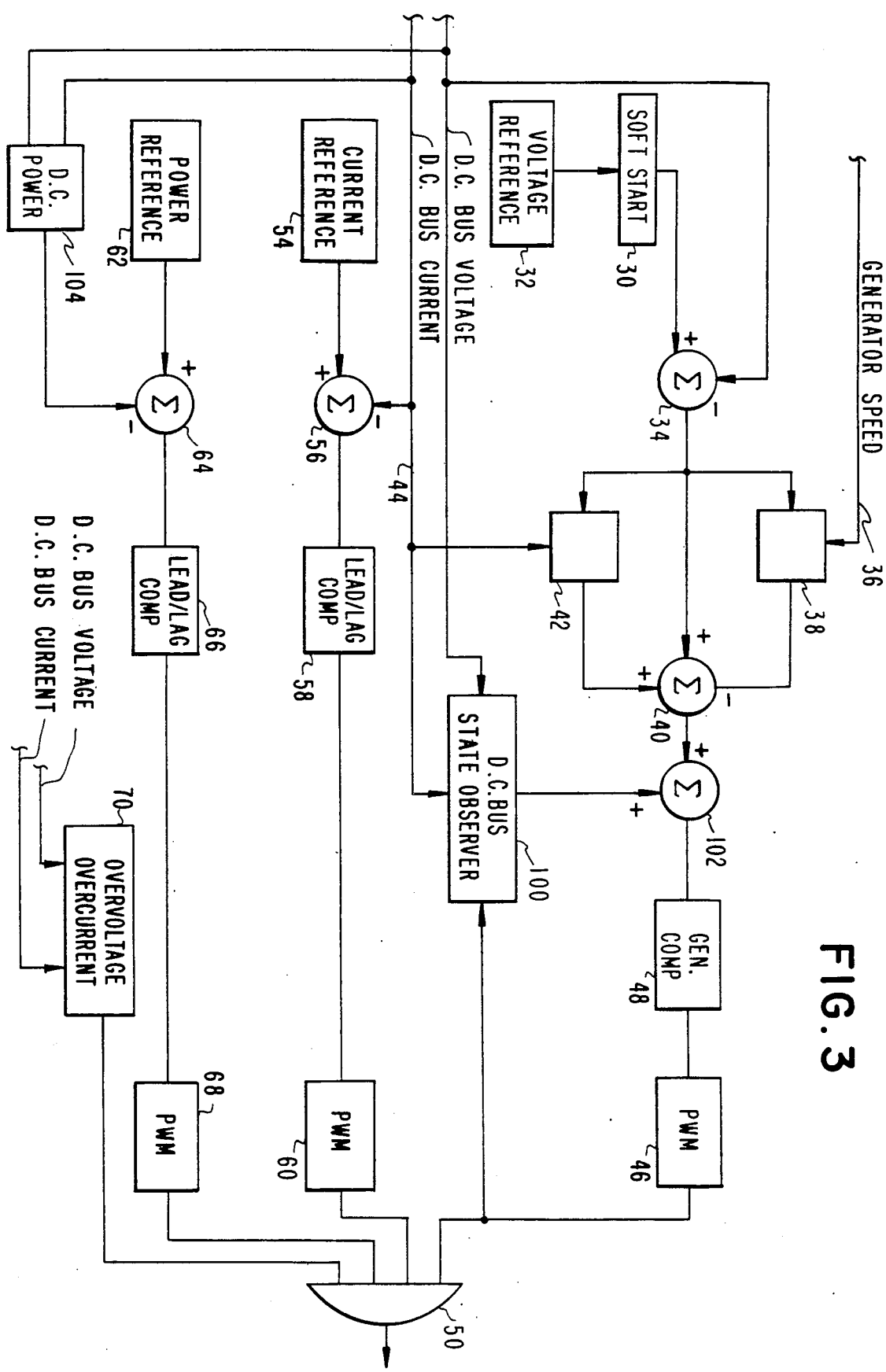
FIG. 3 is a block diagram similar to FIG. 2 of an embodiment of the invention employing a bus state observer.

Referring now to FIG. 3, a preferred embodiment of the invention includes a d.c. bus state observer 100 which provides an output to a summer 102. This output is a function of the predicted d.c. bus voltage for the instantaneous excitation current called for by the output of PWM 46. The output of bus state observer 100 is added to the error signal output of junction 40 and provides low noise lead compensation. The observer 100 has d.c. current and voltage signal inputs and an input from the output of the PWM 46. Its operation will be explained in more detail in connection with FIG. 4. In respects other than the bus state observer the construction and operation of the embodiment of the invention shown in FIG. 3 is the same as that shown and described in connection with FIG. 2.

Figure 4:
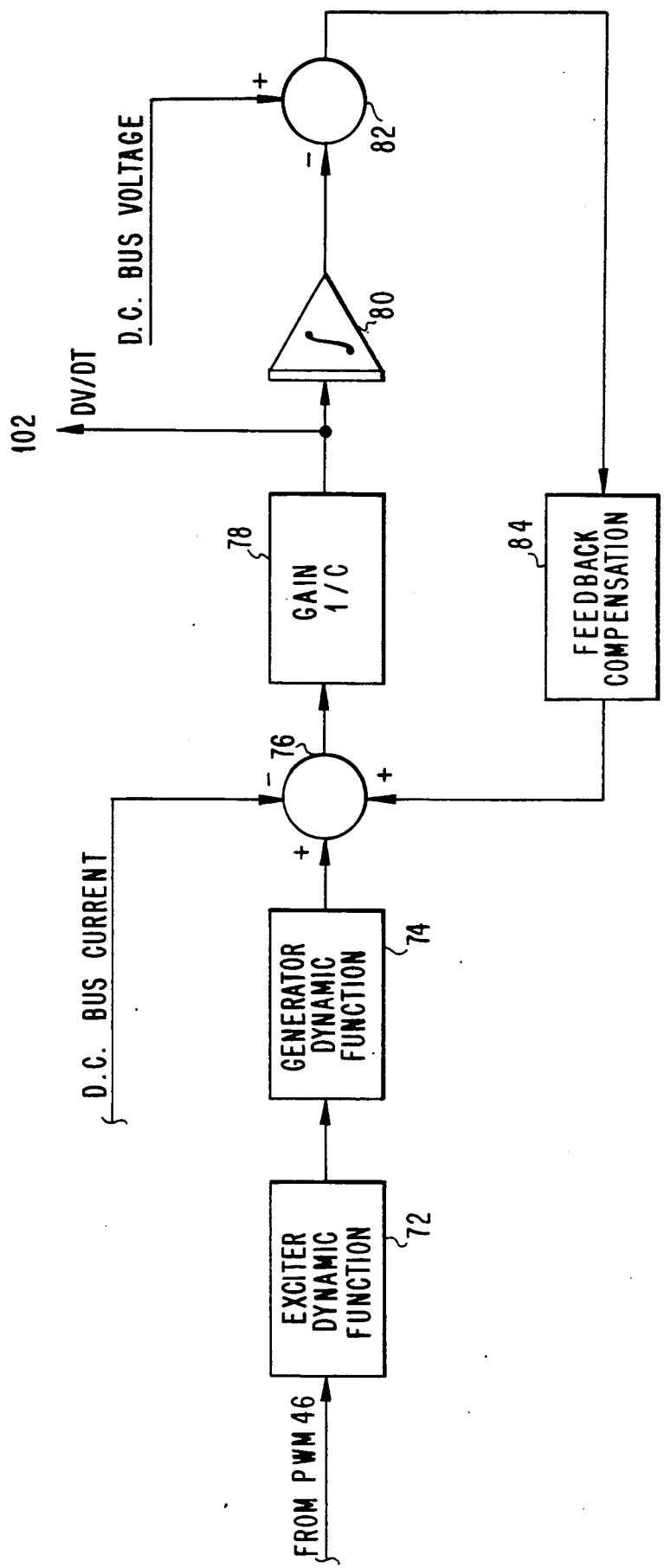
FIG. 4 is a more detailed block diagram of the bus state observer shown in FIG. 3.

Referring now to FIG. 4, the pulse-width-modulated output of PWM 46 is coupled to the input of a model 72 whose transfer function emulates the exciter dynamics so that the output of exciter model 72 for a given pulse-width-modulated duty cycle is proportional to the exciter current. This exciter current input signal is coupled to the input of a model 74 whose transfer function emulates the a.c. generator dynamics so that the output of generator model 74 is a signal proportional to the current output from the a.c. generator 10. The output of model 74 is coupled to a summer 76 whose other input is the d.c. bus current and whose output is an error signal proportional to the difference between the actual d.c. bus current and predicted generator current. The output of the summer 76 is coupled to circuit 78 whose gain is equal to 1/C where C is the capacitance of capacitor 14. The output of circuit 78 is a signal proportional to the rate of change (dv/dt) in d.c. bus voltage in response to a change capacitor current. This output is coupled to summer 102 where it is summed with the error signal from junction 40 to provide lead compensation.

The predicted d.c. bus voltage (output of integrator 80) and the actual d.c. bus are compared at summer 82. A network 84 couples the output of summer 82 back to summer 76.

While the invention has been described in terms of a single preferred embodiment which may be implemented using analogue or digital techniques known to those skilled in the art, and those skilled in the art will recognize that the invention can be practiced with modification within the spirit and scope of the appended claims.

Having thus described our invention. what we claim as new and desire to secure by Letters Patent is as follows:

1. In an aircraft direct current power supply system in which an exciter controls the output of an a.c. generator driven by a variable speed aircraft turbine and the output of the a.c. generator is coupled to a load via a rectifier and a filter capacitor, a variable gain voltage regulator for controlling the d.c. load voltage comprising in combination:

means to compare said d.c. load voltage with a voltage reference, said comparing means generating a signal whose magnitude is a function of the difference between said d.c. load voltage and said d.c. voltage reference; and means to modify said signal including means to increase the gain of said voltage regulator at relatively high-load currents and decrease said gain at relatively low-load currents.

2. In an aircraft direct current power supply system in which an exciter controls the output of an a.c. generator driven by a variable speed aircraft turbine and the output of the a.c. generator is coupled to a load via a rectifier and a filter capacitor, a voltage regulator for controlling the d.c. load voltage comprising in combination:

means to compare said d.c. load voltage with a voltage reference, said comparing means generating a signal whose magnitude is a function of the difference between said d.c. load voltage and said d.c. voltage reference; and means to modify said signal including means to decrease the gain of said voltage regulator as said generator speed increases and increase said gain as said generator speed decreases.

3. In an aircraft direct current power supply system in which an exciter controls the output of an a.c. generator driven by a variable speed aircraft turbine and the output of the a.c. generator is coupled to a load via a rectifier and a filter capacitor, a variable gain voltage regulator for controlling the d.c. load voltage comprising in combination:

means to compare said d.c. load voltage with a voltage reference, said comparing means generating a signal whose magnitude is a function of the difference between said d.c. load voltage and said d.c. voltage reference;

first means to modify said signal including means to increase the gain of said voltage regulator at relatively high-load currents and decrease said gain at relatively low-load currents; and second means to modify said signal including means to decrease the gain of said voltage regulator as said generator speed increases and increase said gain as said generator speed decreases.

4. In an aircraft direct current power supply system in which an exciter controls the output of an a.c. generator driven by a variable speed aircraft turbine and the output of the a.c. generator is coupled to a load via a rectifier and a filter capacitor, a voltage regulator for controlling the d.c. load voltage comprising in combination:

means to compare said d.c. load voltage with a voltage reference, said comparing means generating a signal whose magnitude is a function of the difference between said d.c. load voltage and said d.c. voltage reference; and means to modify the gain of said voltage regulator including means to predict d.c. load voltage changes in response to load current changes based upon a model of the a.c. generator and filter capacitor response.

5. In an aircraft direct current power supply system in which an exciter controls the output of an a.c. generator driven by a variable speed aircraft turbine and the output of the a.c. generator is coupled to a load via a rectifier and a filter capacitor, a voltage regulator for controlling the d.c. load voltage comprising in combination:

means to compare said d.c. load voltage with a voltage reference, said comparing means generating a signal whose magnitude is a function of the difference between said d.c. load voltage and said d.c. voltage reference;

first means to modify the gain of said voltage regulator including means to increase said signal at relatively high-load currents and decrease said gain at relatively low-load currents;

second means to modify the gain of said voltage regulator including means to decrease said gain as said generator speed increases and increase said gain as said generator speed decreases; and third means to modify the gain of said voltage regulator including means to predict d.c. load voltage changes in response to load current changes based upon a model of the a.c. generator and filter capacitor response.

6. A voltage regulator as in claim 1 further including current limiting means, said current limiting means including means to compare the d.c. load current with a current reference and means to reduce the d.c. load voltage below said voltage reference if said load current exceeds a predetermined value.

7. A voltage regulator as in claim 1 further including power limiting means, said power limiting means including means to compare d.c. load power with a power reference and means to reduce the d.c. voltage below said voltage reference if said power exceeds a predetermined value.

8. A voltage regulator as in claim 2 further including current limiting means, said current limiting means including means to compare the d.c. load current with a current reference and means to reduce the d.c. load voltage below said voltage reference if said load current exceeds a predetermined value.

9. A voltage regulator as in claim 3 further including current limiting means, said current limiting means including means to compare the d.c. load current with a current reference and means to reduce the d.c. load voltage below said voltage reference if said load current exceeds a predetermined value.

10. A voltage regulator as in claim 4 further including current limiting means, said current limiting means including means to compare the d.c. load current with a current reference and means to reduce the d.c. load voltage below said voltage reference if said load current exceeds a predetermined value.

11. A voltage regulator as in claim 5 further including current limiting means, said current limiting means including means to compare the d.c. load current with a current reference and means to reduce the d.c. load voltage below said voltage reference if said load current exceeds a predetermined value.

12. A voltage regulator as in claim 2 further including power limiting means, said power limiting means including means to compare d.c. load power with a power reference and means to reduce the d.c. voltage below said voltage reference if said power exceeds a predetermined value.

13. A voltage regulator as in claim 3 further including power limiting means, said power limiting means including means to compare d.c. load power with a power reference and means to reduce the d.c. voltage below said voltage reference if said power exceeds a predetermined value.

14. A voltage regulator as in claim 4 further including power limiting means, said power limiting means including means to compare d.c. load power with a power reference and means to reduce the d.c. voltage below said voltage reference if said power exceeds a predetermined value.

15. A voltage regulator as in claim 5 further including power limiting means, said power limiting means including means to compare d.c. load power with a power reference and means to reduce the d.c. voltage below said voltage reference if said power exceeds a predetermined value.

16. A voltage regulator as in claim 6 further including power limiting means, said power limiting means including means to compare d.c. load power with a power reference and means to reduce the d.c. voltage below said voltage reference if said power exceeds a predetermined value.

17. A voltage regulator as in claim 8 further including power limiting means, said power limiting means including means to compare d.c. load power with a power reference and means to reduce the d.c. voltage below said voltage reference if said power exceeds a predetermined value.

18. A voltage regulator as in claim 9 further including power limiting means, said power limiting means including means to compare d.c. load power with a power reference and means to reduce the d.c. voltage below said voltage reference if said power exceeds a predetermined value.

19. A voltage regulator as in claim 10 further including power limiting means, said power limiting means including means to compare d.c. load power with a power reference and means to reduce the d.c. voltage below said voltage reference if said power exceeds a predetermined value.

20. A voltage regulator as in claim 11 further including power limiting means, said power limiting means including means to compare d.c. load power with a power reference and means to reduce the d.c. voltage below said voltage reference if said power exceeds a predetermined value.

* * * * *